United States Patent
Giaretta et al.

(10) Patent No.: US 8,996,649 B2
(45) Date of Patent: Mar. 31, 2015

(54) UTILIZING POLICIES FOR OFFLOAD AND FLOW MOBILITY IN WIRELESS COMMUNICATIONS

(75) Inventors: Gerardo Giaretta, San Diego, CA (US); Patrick Stupar, Nuremberg (DE); Peter C. Thompson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 13/010,401

(22) Filed: Jan. 20, 2011

(65) Prior Publication Data

US 2012/0023189 A1    Jan. 26, 2012

Related U.S. Application Data

(60) Provisional application No. 61/302,067, filed on Feb. 5, 2010.

(51) Int. Cl.
| | |
|---|---|
| G06F 15/16 | (2006.01) |
| H04W 36/00 | (2009.01) |
| H04M 11/04 | (2006.01) |
| H04W 4/00 | (2009.01) |
| H04L 12/24 | (2006.01) |
| H04W 48/18 | (2009.01) |
| H04W 8/24 | (2009.01) |
| H04W 84/12 | (2009.01) |

(52) U.S. Cl.
CPC .............. *H04W 48/18* (2013.01); *H04W 8/245* (2013.01); *H04W 84/12* (2013.01)

USPC ........ 709/217; 370/235; 370/331; 455/404.2; 455/435.2

(58) Field of Classification Search
USPC .......... 709/217–229, 250; 370/252, 328–338; 726/1–3; 455/404.2, 435.2
See application file for complete search history.

(56) References Cited

U.S. PATENT DOCUMENTS

| | | | |
|---|---|---|---|
| 2008/0102787 A1* | 5/2008 | Landschaft et al. | 455/404.2 |
| 2009/0005041 A1* | 1/2009 | Steinberg et al. | 455/435.2 |
| 2010/0195503 A1* | 8/2010 | Raleigh | 370/235 |
| 2012/0250658 A1* | 10/2012 | Eisl et al. | 370/331 |

FOREIGN PATENT DOCUMENTS

| | | |
|---|---|---|
| WO | WO2006004784 A1 | 1/2006 |
| WO | WO2009025601 A1 | 2/2009 |

OTHER PUBLICATIONS

International Search Report and Written Opinion—PCT/US2011/023508, ISA/EPO—Aug. 29, 2011.

(Continued)

*Primary Examiner* — Jung Park
*Assistant Examiner* — Chuong M Nguyen
(74) *Attorney, Agent, or Firm* — François A. Pelaez

(57) ABSTRACT

Methods and apparatuses are provided that facilitate downloading and/or applying policies for a current configuration of network interfaces. Where a network interface of a device is deactivated or otherwise losses connection, the device can ensure policies for communicating without the network interface are enforced. Where such policies are not available, the policies can be downloaded to ensure the device stores policies for the network interface configuration.

40 Claims, 11 Drawing Sheets

(56) References Cited

OTHER PUBLICATIONS

LG Electronics et al., "Per IP flow class inter-system mobility policies", 3GPP Draft; S2-100298_23402_CR0863_IFOM_ANDSF, 3rd Generation Partnership Project (3GPP), Mobile Competence Centre; 650, Route Des Lucioles; F-06921 Sophia-Antipolis Cedex; France, vol. SA WG2, No. Shenzhen; 20100118, Jan. 12, 2010, XP050432871, [retrieved on Jan. 12, 2010].
Taiwan Search Report—TW100104137—TIPO—Jan. 16, 2014.

* cited by examiner

UTILIZING POLICIES FOR OFFLOAD AND FLOW MOBILITY IN WIRELESS COMMUNICATIONS

CLAIM OF PRIORITY UNDER 35 U.S.C. §119

The present application for patent claims priority to Provisional Application No. 61/302,067 entitled "APPLICABILITY OF POLICIES FOR WLAN OFFLOAD AND IP FLOW MOBILITY IN A WIRELESS COMMUNICATION SYSTEM" filed Feb. 5, 2010, and assigned to the assignee hereof and hereby expressly incorporated by reference herein.

BACKGROUND

1. Field

The following description relates generally to wireless network communications, and more particularly to obtaining and utilizing policies for offload and/or flow mobility.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices can communicate with a wireless network using multiple network connections to increase diversity, increase data rate, provide additional functionality, and/or the like. In one example, a device can communicate with the wireless network over an LTE connection and a wireless local area network (WLAN) connection. Furthermore, the device can download policies related to utilizing the multiple network connections. In an example, one or more policies can specify parameters for using at least one of the multiple connections, such as to use WLAN for all hypertext transport protocol (HTTP) data and/or data having a transport protocol destination port of 80. The device can include logic to interpret the policies and appropriately route incoming and/or outgoing data over the specified network connection. In LTE devices having WLAN capability, these policies can be known as WLAN-offload policies since the policies define scenarios for using a WLAN connection instead of an LTE connection for certain applications, certain types of data, certain internet protocol (IP) endpoints, certain IP ports, etc. In typical LTE deployments, devices with WLAN capability download WLAN-offload policies from the network, and utilize the WLAN-offload policies in scenarios defined by parameters in the policies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with ensuring a device utilizes policies related to a current set of network interfaces or connections. For example, a device can include multiple network connections over multiple network interfaces, and can download one or more offload policies for utilizing the multiple interfaces instead of a default one of the interfaces. The device can additionally download other policies related to using a subset of the network interfaces where a network interface related to the offload may not be available. This can be performed when downloading the offload policies, based at least in part on one or more triggers (such as deactivating one or more of the network interfaces or related connections) and/or the like. In the latter case, the device can download policies when needed as opposed to all policies at once, which can conserve bandwidth and power.

According to an example, a method for communicating over at least one of a plurality of network interfaces is provided that includes determining a configuration of a plurality of network interfaces and determining whether to download one or more policies based at least in part on the configuration of the plurality of network interfaces. The method further includes applying the one or more policies based at least in part on the configuration of the plurality of network interfaces.

In another aspect, an apparatus for communicating over at least one of multiple network interfaces is provided that includes at least one processor configured to discern a configuration of a plurality of network interfaces and determine whether to download one or more policies based at least in part on the configuration of the plurality of network interfaces. The at least one processor is further configured to enforce the one or more policies based at least in part on the configuration of the plurality of network interfaces. In addition, the apparatus includes a memory coupled to the at least one processor.

In yet another aspect, an apparatus for communicating over at least one of multiple network interfaces is provided that includes means for determining a configuration of a plurality of network interfaces and means for determining whether to download one or more policies based at least in part on the configuration of the plurality of network interfaces. The apparatus further includes means for applying the one or more policies based at least in part on the configuration of the plurality of network interfaces.

Still, in another aspect, a computer-program product is provided for communicating over at least one of multiple network interfaces including a computer-readable medium having code for causing at least one computer to discern a configuration of a plurality of network interfaces. The computer-readable medium further includes code for causing the at least one computer to determine whether to download one or more policies based at least in part on the configuration of the plurality of network interfaces and code for causing the at least one computer to enforce the one or more policies based at least in part on the configuration of the plurality of network interfaces.

Moreover, in an aspect, an apparatus for communicating over at least one of multiple network interfaces is provided that includes a network interface configuration determining component for discerning a configuration of a plurality of network interfaces and a policy downloading component for determining whether to download one or more policies based at least in part on the configuration of the plurality of network interfaces. The apparatus further includes a policy enforcing component for applying the one or more policies based at least in part on the configuration of the plurality of network interfaces.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
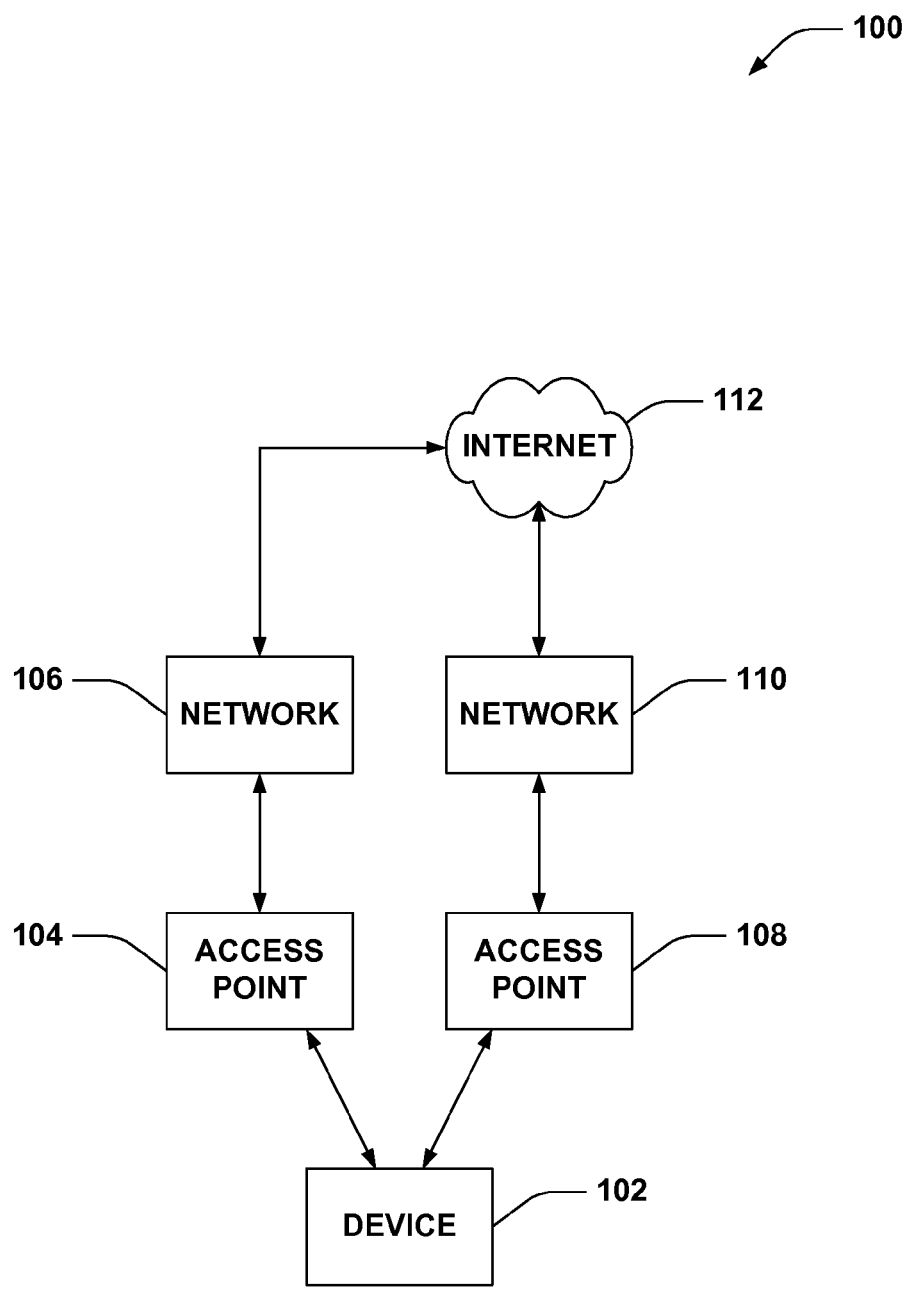
FIG. 1 illustrates an example system for communicating over a plurality of network connections.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a device having multiple network interfaces can be provided offload policies for utilizing the multiple network interfaces according to one or more parameters, and policies for operating with a subset of the multiple network interfaces. For example, the device can receive the policies for operating with a subset of the multiple network interfaces upon receiving the offload policies. In another example, the device can request the policies for operating with a subset of the multiple network interfaces based at least in part on one or more events or triggers, such as termination of one or more network connections over the network interfaces or the deactivation of the network interface itself, and/or the like. The device can additionally apply policies based at least in part on the one or more triggers. This can ensure the device has the correct policy for a given set of available network interfaces and/or connections.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates communicating over multiple network interfaces. System 100 includes a device 102 that can communicate with an access point 104 to receive access to a network 106, which can for example provide access to Internet 112. In addition, device 102 can communicate with access point 108 to access network 110, which can also provide access to Internet 112. For example, device 102 can be a UE, modem (or other tethered device), a portion thereof, and/or the like. Access points 104 and 108 can each be a macrocell, femtocell, picocell, or similar base station, a router (e.g., a 802.11b (WiFi) hotspot or similar router), relay node, device communicating in peer-to-peer or ad-hoc mode with device 102, a portion thereof, and/or the like. Networks 106 and 110 can each be a 3GPP, 3GPP LTE, UMTS, WiMAX, wireless local area network (WLAN), Bluetooth, or similar networks offering access point or peer entry thereto. In addition, in one example, device 102 can access network 106 via access point 108 accessing network 110 to communicate with network 106 over Internet 112.

For example, network 106 can be an LTE network that includes a home subscriber server (HSS), mobility management entity (MME), packet data network (PDN) gateway, and/or the like, related to device 102. In this example, access point 108 can be a WLAN that can communicate with one or more components of network 106 over Internet 112 for parameters related to calls using voice over internet protocol (VoIP), accessing subscription information, etc. for device 102. In another example, however, it is to be appreciated that network 110 may not be able to access components of network 106.

According to an example, device 102 can download one or more policies related to utilizing multiple network interfaces. For example, the policies can specify parameters for determining to use a network interface that connects to access point 104 for certain communications while using a different network interface that connects to access point 108 for other communications. Device 102 can accordingly enforce the policies to route data packets to/from networks 106 and 110 over appropriate access points 104 or 108 based at least in part on one or more parameters. For example, the policies can specify to route packets related to an application over a network interface that connects to access point 108. In another example, the policies can specify to route packets of a certain protocol type, a certain source or destination IP (e.g., 192.168.1.23) or transmission control protocol (TCP) port (e.g., destination port 80), a certain source or destination endpoint, etc., through access point 108. Thus, device 102 can route packets to access point 108, where the packets have parameters corresponding to those specified in the policies, and to access point 104 otherwise and/or according to other policies. In addition, for example, the policies can include a default policy for routing packets where no other policy applies. In another example, the policies can be offload policies that define scenarios for using a network interface other than a default network interface.

In one example, however, device 102 can deactivate a network interface related to the connection to access point 108. This can include a user switching off the network interface, losing or terminating connection over the interface (e.g., due to signal quality below a threshold level, denial of service from access point 108, etc.), and/or the like. Device 102 can download policies for communicating where the network interface that allows communication with access point 108 is deactivated and/or connection with access point 108 or a similar access point is terminated. In one example, device 102 can download the policies upon downloading the one or more policies related to utilizing multiple network interfaces. In another example, device 102 can download policies based at least in part on one or more triggers or events, such as the deactivation of the network interface, termination of a connection, etc. For example, device 102 can additionally determine whether to download the policies based at least in part on evaluating stored policies to determine whether the stored policies include one or more policies for communicating without the deactivated network interface. In either case, for example, the policies for communicating where the network interface is deactivated and/or connection is terminated can be applied based at least in part on the one or more triggers or events.

In one example, device 102 can detect the trigger or event based at least in part on determining connection failure with access point 108 or one or more other access points over the network interface, receiving an event related to switching off the network interface, and/or the like. Similarly, where the network interface is switched on, connection with an access point 108 or a similar access point becomes active, and/or the like, device 102 can download and/or apply the one or more policies related to utilizing multiple network interfaces. Thus, the device 102 stores and applies policies related a current network interface configuration. In addition, though only two interfaces at device 102 are described, it is to be appreciated that the above functionality can be applied for more than two interfaces and/or connections such that policies can be downloaded and/or applied where one or more of the network interfaces is activated and/or deactivated or related connection(s) is/are established and/or terminated.

Figure 2:
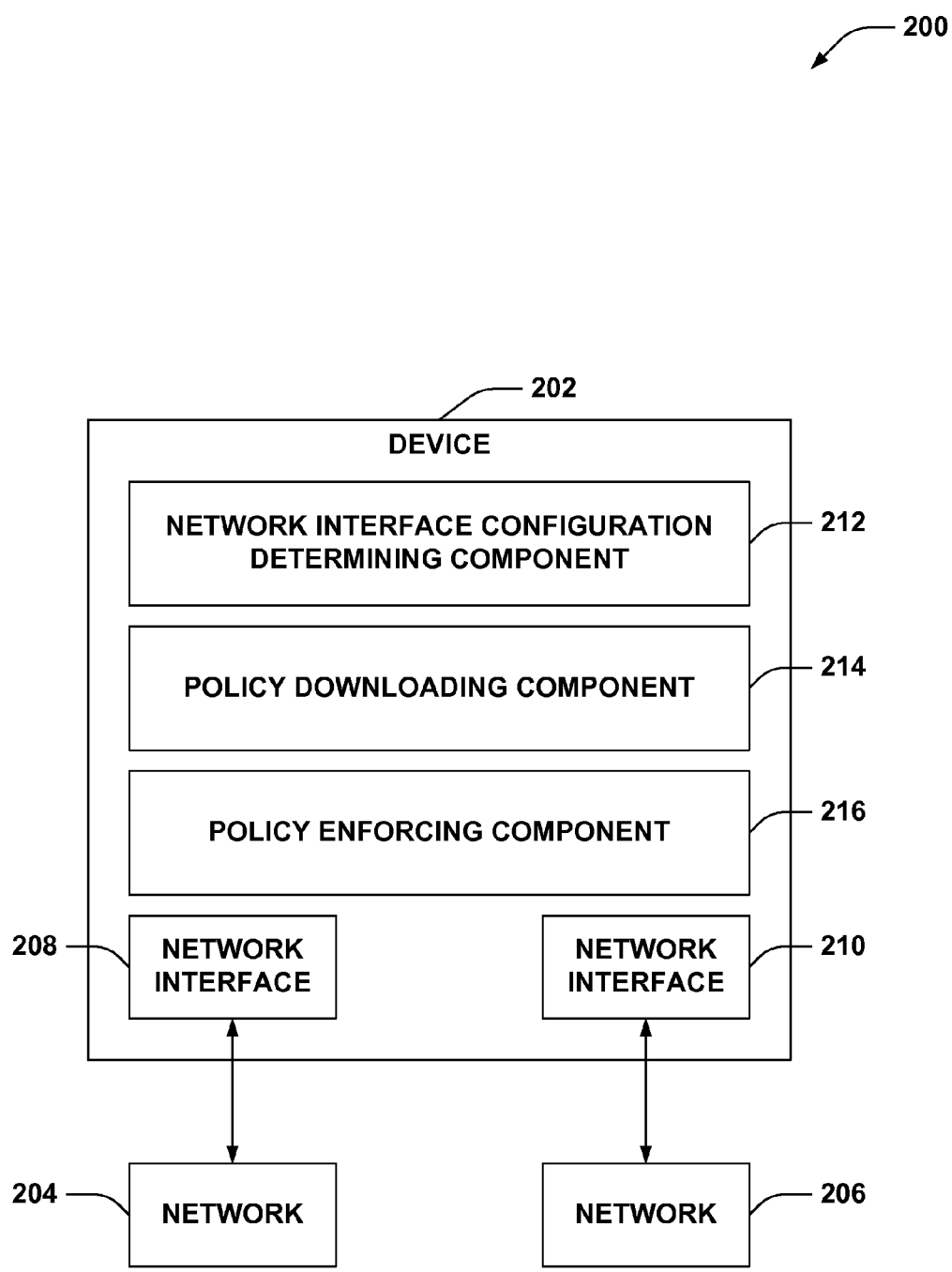
FIG. 2 illustrates an example system for applying policies based on a network interface configuration.

Turning to FIG. 2, an example wireless communication system 200 is illustrated that facilitates applying one or more policies for a given network interface configuration. System 200 comprises a device 202 that can communicate with one or more networks, such as networks 204 and 206 (e.g., through one or more access points (not shown), as described above). As described, device 202 can be a UE, modem, etc., networks 204 and 206 can each be a 3GPP, WLAN, or similar network, etc. Device 202 can include a plurality of network interfaces 208 and 210 that communicate with networks 204 and 206, respectively (e.g., via one or more access points and/or other components). Device 202 can additionally comprise a network interface configuration determining component 212 for discerning one or more parameters related to a configuration of network interfaces 208 and 210, a policy downloading component 214 for determining whether to download one or more policies related to the configuration, and a policy enforcing component 216 for applying the one or more policies to accordingly route communications to networks 204 and 206.

According to an example, device 202 can communicate with network 204 over network interface 208 and/or with network 206 over network interface 210, as described. Network interface configuration determining component 212 can discern one or more parameters regarding configuration of network interfaces 208 and/or 210. This can include determining an activation state of the network interfaces 208 and/or 210, determining whether network interfaces 208 and/or 210 have an active connection to networks 204 and/or 206, etc. Based at least in part on the configuration, policy downloading component 214 can detect whether to download one or more policies for utilizing the network interfaces 208 and/or 210. This can include, for example, determining whether a set of policies stored by policy enforcing component 216 includes one or more policies related to the current network interface configuration (e.g., where a network interface is deactivated, whether one or more policies regarding communicating without the network interface are in the set of stored policies). For example, this can be determined based at least in part on one or more parameters or other aspects of the policies (e.g., comparing one or more parameters or identifiers thereof to a stored or otherwise received value).

Moreover, for example, policy downloading component 214 can download the one or more policies based at least in part on requesting the policies from an access network discovery and selection function (ANDSF) or other network nodes, acquiring a relevant portion of a policy definition from one or more nodes (e.g., one or more elements where the policy definition is an extensible markup language (XML), and/or the like). In any case, policy enforcing component 216 can apply stored policies to facilitate communicating over network interfaces 208 and/or 210. The stored policies, for example, can have been downloaded by policy downloading component 214.

In an example, network interface configuration determining component 212 detects modification or other trigger or event related to the configuration of network interfaces 208 and/or 210. As described, this can include detecting modification of an activation state of network interface 208 and/or 210 (e.g., activation and/or deactivation of the network interfaces 208 and/or 210), termination or otherwise decreasing signal quality of a connection over network interface 208 and/or 210, and/or the like. Upon detecting such, policy downloading component 214 can determine whether to download one or more policies related to the network interface 208 and/or 210 configuration. Thus, for example, network interface 210 can be deactivated, and policy downloading component 214 determines whether policy enforcing component 216 has a stored policy related to communicating without network interface 210. If not, policy downloading component 214 can obtain one or more such policies from network 204, 206, or another network (e.g., over network interface 208, as described). In either case, policy enforcing component 216 can enforce one or more such policies based at least in part on a modification to the network interface configuration. For example, enforcing the one or more policies can include routing communications to network interface 208 (e.g., and/or other network interfaces other than network interface 210) according to parameters specified in the one or more polices, as described.

In another example, network interface configuration determining component 212 discerns the network interface configuration upon initially connecting to network 204 and/or network 206 over network interface 208 and/or 210. Policy downloading component 214 can request one or more policies from network 204 and/or network 206 based at least in part on existence of network interfaces 208 and 210, an activation state of network interfaces 208 and/or 210, or connection state of network interfaces 208 and/or 210, etc. This can include, for example, requesting one or more policies for communicating over both of network interfaces 208 and 210 (e.g., offloading communications from network interface 208 to network interface 210), communicating over one of network interface 208 or 210, and/or the like. In any case, where network interface configuration is modified, as described, policy downloading component 214 can acquire an appropriate policy or set of policies if not already stored for communicating using available network interfaces, and policy enforcing component 216 can apply the policy or set of policies. Moreover, for example, network interface configuration determining component 212 can detect deactivation of an ability to concurrently utilize a plurality of network interfaces. This can similarly cause policy downloading component 214 to acquire one or more policies related to utilizing one of network interfaces 208 or 210, and policy enforcing component 216 to enforce such policies.

In a specific example, network 204 can be an LTE network, and network 206 can be a WLAN; thus, network interface 208 can be an LTE interface, and network interface 210 can be a WLAN interface. In this example, network interface configuration determining component 212 can detect the network interface configuration as including network interface 210, which can be a WLAN interface, and policy downloading component 214 can request WLAN offload policies from network 204 (e.g., ANDSF) over a open mobile alliance device management (OMA-DM) protocol, in one or more management objects (MO), and/or the like). As described, the WLAN offload policies can relate to parameters for routing data over network interface 210 to network 206. For example, the policies can specify to route packets related to an application over network interface 210. In another example, the policies can specify to route packets of a certain type (e.g., VoIP, audio or video streaming, gaming, hypertext transport protocol (HTTP), etc.), a certain IP or transmission control protocol (TCP)/IP port (e.g., port 80), a certain endpoint (e.g., an address of one or more servers) over network interface 210 to network 206. Policy enforcing component 216 can apply the policies for communicating over network interfaces 208 and 210. In one example, policy downloading component 214 can request the WLAN offload policies upon establishing connection with network 204 or as part of an initialization procedure.

In addition, policy downloading component 214 can request non-WLAN offload policies from network 204, which can relate to policies for communicating without leveraging network interface 210. For example, policy downloading component 214 can request such policies upon requesting the WLAN offload policies, according to one or more triggers or events, and/or the like, as described. In the latter case, for example, network interface configuration determining component 212 can detect a modification to the network interface configuration including deactivation of network interface 210, which as described can be a WLAN interface, a loss of connection over network interface 210, deactivation of an ability to communicate over multiple network interfaces, and/or the like. Policy downloading component 214 can, in this example, determine whether policy enforcing component 216 stores one or more policies related to not using network interface 210 (e.g., non-WLAN offload policies). If not, policy downloading component 214 can download non-WLAN offload policies (e.g., from network 204 over network interface 208). In either case, policy enforcing component 216 can enforce one or more non-WLAN offload policies (e.g., instead of WLAN offload policies), for example, based at least in part on the deactivated network interface 210 or loss of connection over the network interface 210, as described.

Similarly, network interface configuration determining component 212 can detect modification of the network interface configuration including activation of network interface 210 and/or connection to network 206. Policy downloading component 214 can determine whether policy enforcing component 216 stores one or more WLAN offload policies for communicating over both network interface 208 and network interface 210. If not, policy downloading component 214 can download one or more WLAN offload policies (e.g., and/or can determine whether one or more WLAN offload policies are available for download). For example, policy downloading component 214 can download the one or more WLAN offload policies and/or determine whether one or more WLAN offload policies are available from network 204 and/or network 206 over network interface 208 and/or 210, as described. In either case, policy enforcing component 216 can apply the WLAN offload policies based at least in part on network interface configuration determining component 212 detecting activation of network interface 210 and/or connection to network 206.

In another example, WLAN offload policies can be included in a broader set of one or more policies for communicating without a WLAN interface. Thus, upon deactivation of network interface 210 and/or termination of a connection to network 206, policy enforcing component 216 can apply at least a portion of the one or more WLAN offload policies related to communicating without network interface 210.

Figure 3:
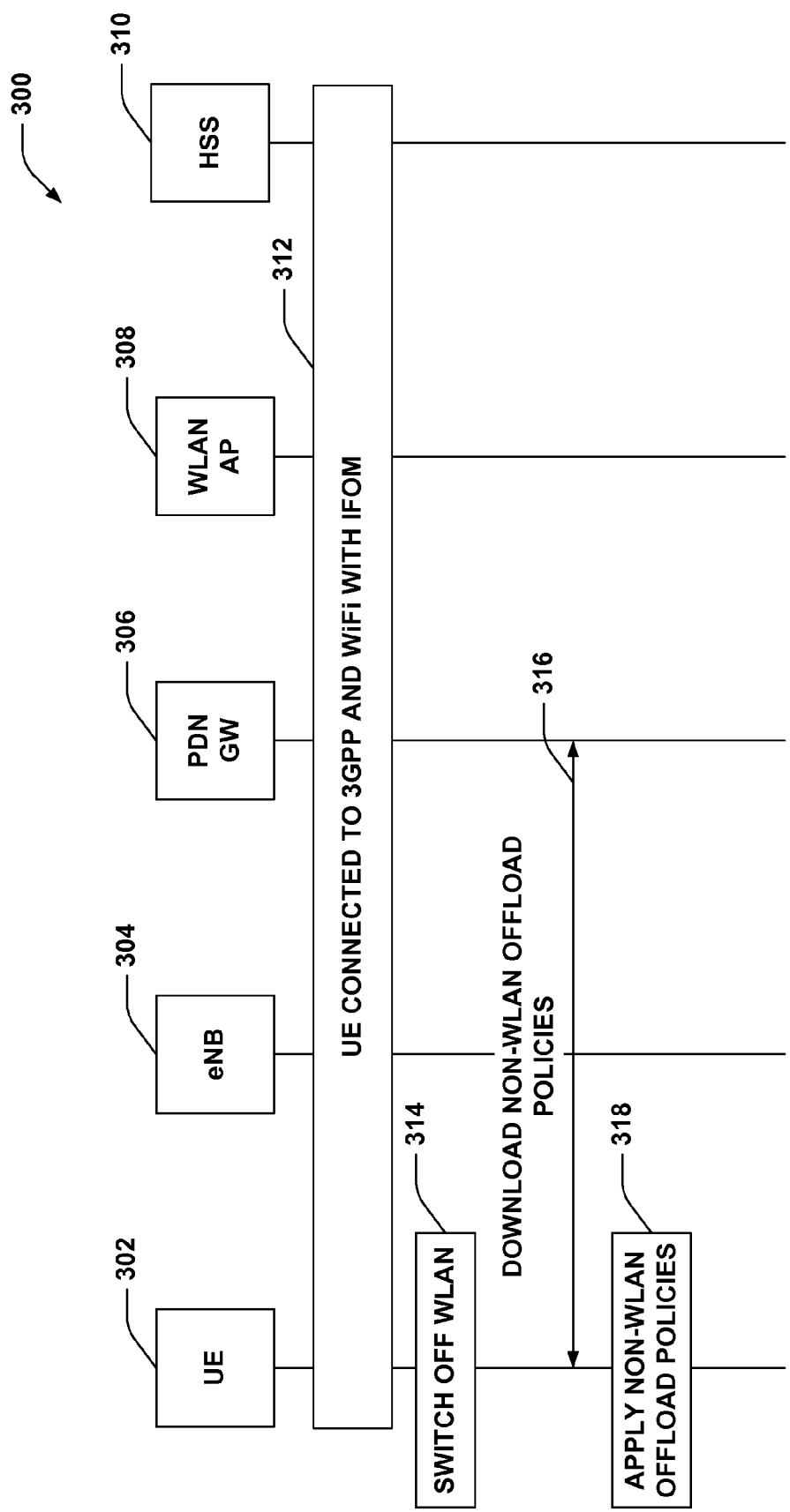
FIG. 3 illustrates an example system for downloading and applying policies based at least in part on detecting deactivation of a network interface.

Turning to FIG. 3, an example wireless communication system 300 that facilitates downloading non-WLAN offload policies is illustrated. System 300 can include a UE 302 that can communicate with an eNB 304 (e.g., to access an MME or one or more other 3GPP LTE network components that provide authentication and/or authorization for UE 302). eNB 304 can communicate with a PDN gateway (GW) 306 to communicate information to and from a HSS 310. For example, PDN GW 306 can be a home agent GW of UE 302. It is to be appreciated that additional components can exist between the various nodes depicted to facilitate communications therebetween. In addition, UE 302 can communicate with a WLAN access point (AP) 308 to additionally communicate with PDN GW 306. UE 302 can be connected to LTE and WLAN with IP flow mobility (IFOM) 312 through eNB 304 and WLAN AP 308, as described. Flow mobility, for example, can relate to the ability to transfer flows of one connection (e.g., the LTE connection) to another connection (e.g., the WLAN connection).

In this example, UE 302 can download WLAN offload policies as part of communicating with eNB 304 (e.g., based at least in part on detecting WLAN capability). As described, the WLAN offload policies can indicate network preferences regarding flow distribution over the active interfaces (e.g., WLAN and LTE). UE 302 can switch off WLAN 314; as described, this can include a user turning off WLAN or dual radio capability, and/or the like. Based at least in part on switching off WLAN, UE 302 can download non-WLAN offload policies from PDN GW 306 or one or more other network components (e.g., an MME, etc.) to facilitate communicating without the WLAN interface. In this regard, as described, UE 302 can apply the non-WLAN offload policies to communicate without the WLAN interface.

Figure 4:
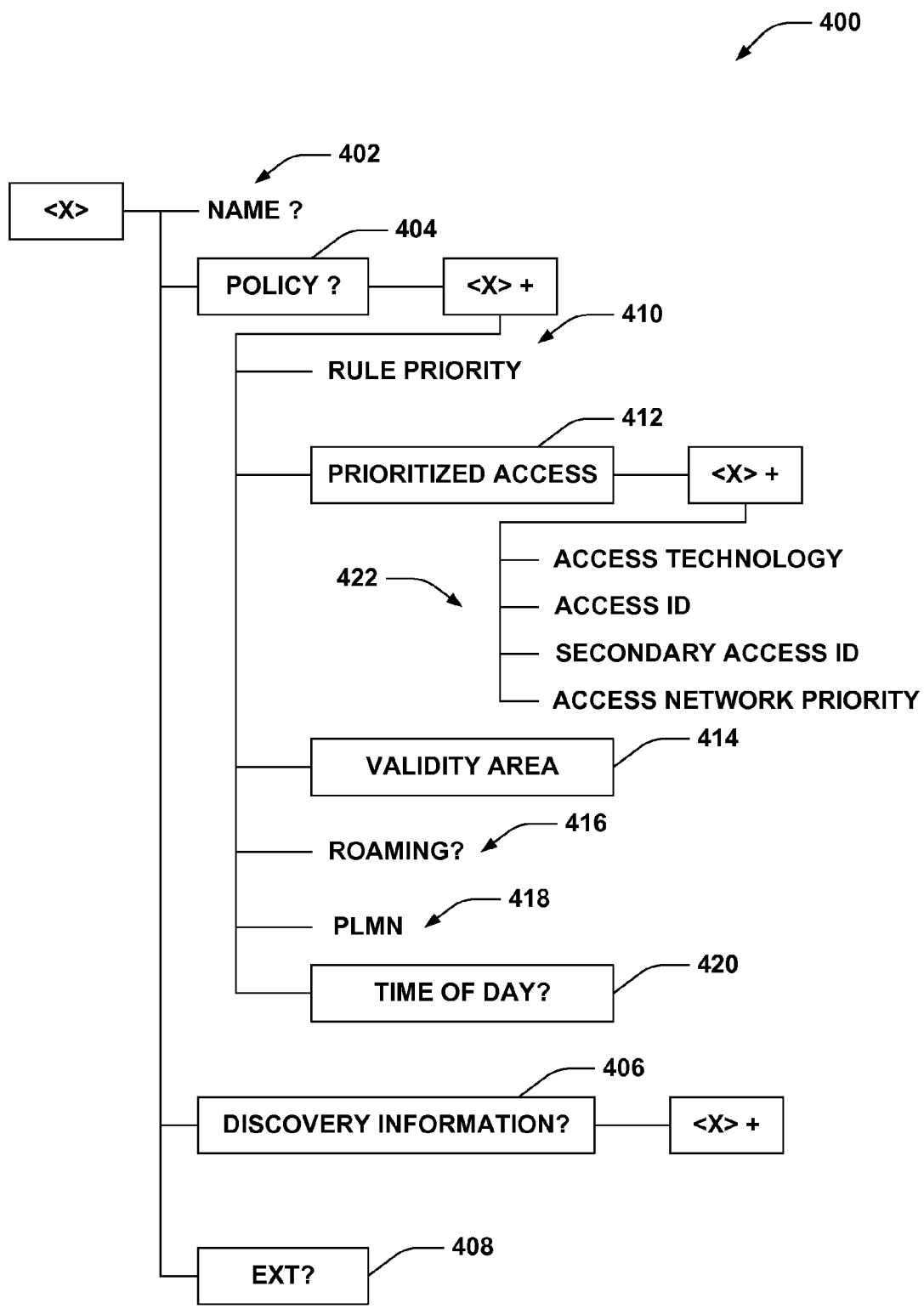
FIG. 4 illustrates an example policy definition according to aspects described herein.

Turning to FIG. 4, an example non-WLAN offload policy definition 400 is illustrated. For example, the non-WLAN offload policy definition 400 can be an XML definition that can be downloaded by one or more devices (e.g., from an ANDSF), as described, including parameters that indicate a preferred network interface (e.g., access) to be used under certain conditions, providing information regarding neighboring networks for efficient scanning, etc. An XML element X with an optional name attribute 402 is shown that can have multiple child elements, such as an optional policy element 404, discovery information 406, extensions 408, etc. There can be multiple policy elements 404 for given scenarios, which can each include a rule priority attribute 410 that specifies a priority for the policy, a prioritized access element 412 that includes information regarding the access related to the priority, a validity area element 414 that can relate to a location for which the policy is valid, an optional roaming attribute 416 that indicates whether the policy is available in a roaming scenario, a PLMN attribute 418 that can specify a related PLMN for the policy, and an optional time of day element 420 that indicates times of day during which the policy is valid.

Prioritized access element 412 can include a collection of attributes 422 regarding the access to be used according to the policy, including access technology, access identifier, secondary access identifier, access network priority, etc. Thus, a device utilizing one or more policies according to the non-WLAN offload policy definition 400 can determine a prioritized access to utilize for communicating over a network interface given a set of current radio condition parameters (e.g., area, roaming, PLMN, time of day, etc.). As described above, for example, a device can download the non-WLAN offload policy regardless of whether the device includes a WLAN interface. Thus, where a WLAN interface on the device is deactivated or otherwise loses connection, one or more policies according to the non-WLAN offload policy definition 400 can be enforced. As described, a device can download the non-WLAN offload policies along with WLAN offload policies, upon deactivating the WLAN interface or losing connection, and/or the like, to ensure the device stores appropriate policies for a given network interface configuration.

Figure 5:
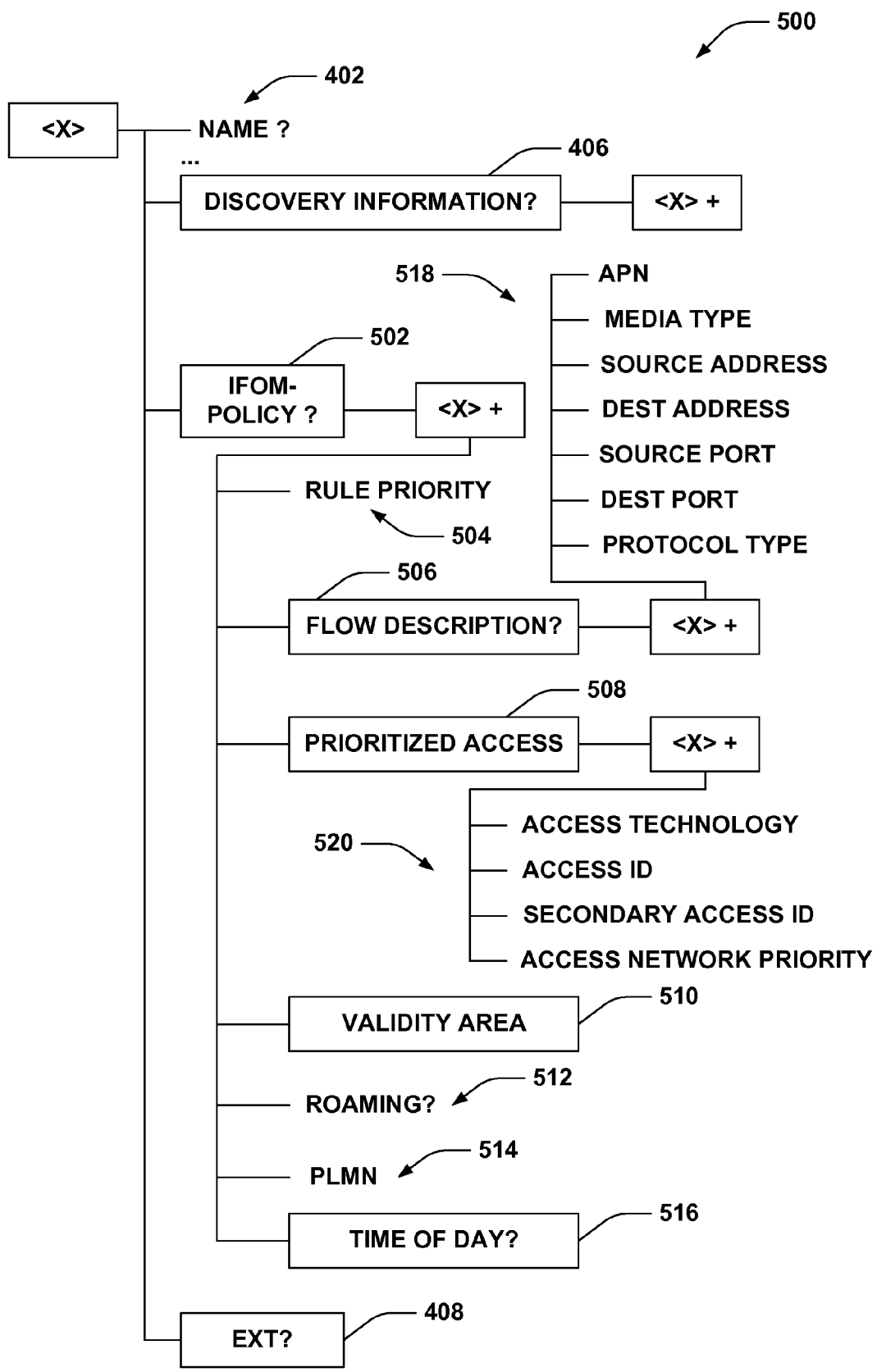
FIG. 5 illustrates an example policy extension definition according to aspects described herein.

Referring to FIG. 5, an example WLAN offload policy extension definition 500 is illustrated. For example, the WLAN offload policy extension definition 500 can be an XML definition that can be downloaded by one or more devices (e.g., from an ANDSF), as described, including attributes and elements that indicate parameters for offloading communications from an LTE interface to a WLAN interface. An XML element X with an optional name attribute 402 is shown that can have multiple child elements, such as discovery information 406, extensions 408, etc. In addition, WLAN offload policy extension definition 500 can include policy elements as shown in FIG. 4. There can be multiple IFOM policy elements 502 for given scenarios that specify to offload communications to a WLAN interface, which can each include a rule priority attribute 504 that specifies a priority for the IFOM policy, an optional flow description 506 that provides some parameters for identifying a scenario for using WLAN offload, a prioritized access element 508 that includes information regarding the access related to the priority and/or flow description, a validity area element 510 that can relate to a location for which the policy is valid, an optional roaming attribute 512 that indicates whether the policy is available in a roaming scenario, a PLMN attribute 514 that can specify a related PLMN for the policy, and an optional time of day element 516 that indicates times of day during which the policy is valid.

Flow description element 506 can include a set of attributes 518 related to defining a scenario for using a certain access, including an access point network (APN), media type, source address (e.g., IP address), destination address, source port (e.g., TCP port), destination port, and/or protocol type. Prioritized access element 508 can include a collection of attributes 520 regarding the access to be used according to the IFOM policy, including access technology, access identifier, secondary access identifier, access network priority, etc. Thus, a device utilizing one or more policies including extensions according to the WLAN offload policy extension definition 500 can determine an access to utilize according to comparing packets to attributes of given flow description elements 506, and further according to a set of current radio condition parameters (e.g., area, roaming, PLMN, time of day, etc.). As described above, for example, a device can download the WLAN offload policy extensions where the device includes a WLAN interface (e.g., as part of an initialization procedure and/or based at least in part on detecting existence and/or activation of the WLAN interface or a related connection, etc.), and can utilize the policy extensions as described.

Figure 6:
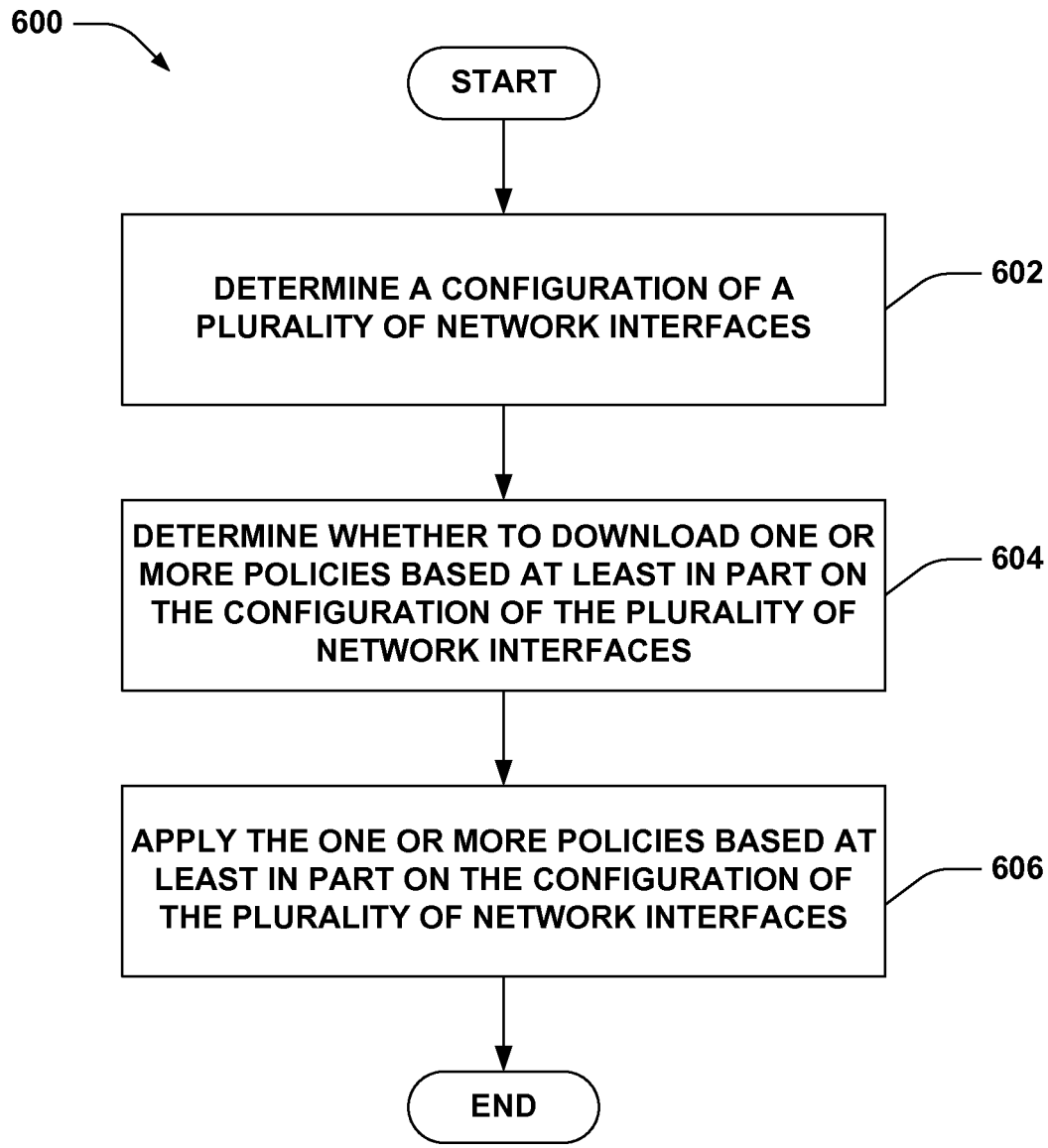
FIG. 6 illustrates an example methodology that applies policies based at least in part on a determined configuration of network interfaces.
Figure 7:
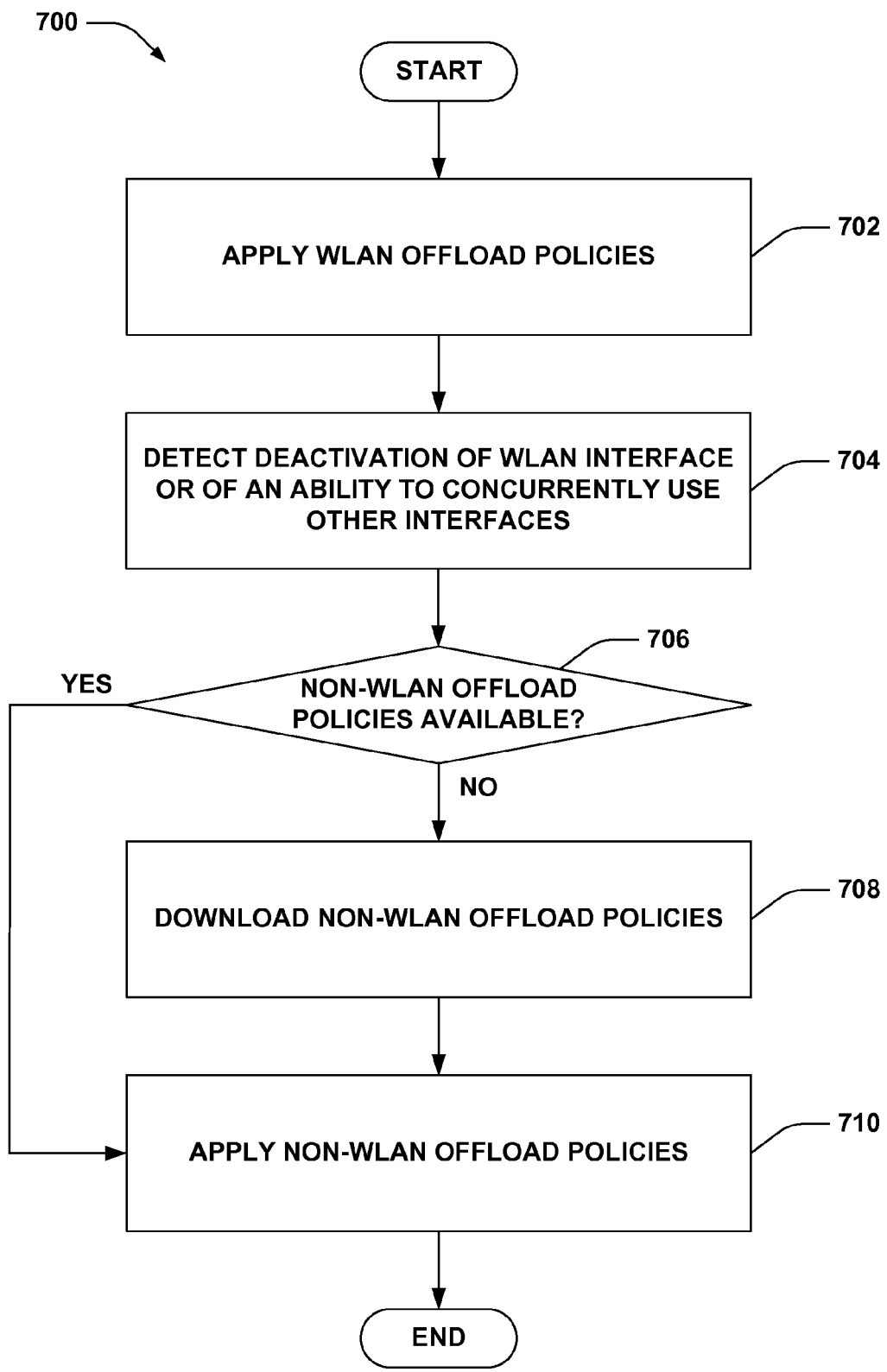
FIG. 7 illustrates an example methodology that applies and/or downloads non-wireless local area network (WLAN) offload policies based on deactivating a WLAN interface.

Referring to FIGS. 6-7, example methodologies relating to downloading and/or applying policies for utilizing one or more network interfaces are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 6, an example methodology 600 is displayed that facilitates applying one or more policies for a given configuration of network interfaces. At 602, a configuration of a plurality of network interfaces can be determined. In one example, the configuration can be determined based at least in part on a detected modification to one or more of the network interfaces (e.g., activation or deactivation of one of the network interfaces, termination or establishment of a connection over one of the network interfaces, etc.), as described. At 604, it can be determined whether to download one or more policies based at least in part on the configuration of the plurality of network interfaces. For example, this can relate to determining whether one or more stored policies relate to the configuration of network interfaces. Where a network interface is deactivated for example, determining whether to download one or more policies at 604 can include determining whether one or more stored policies are available for communicating without the network interface. In another example, where a network interface is activated, determining whether to download one or more policies at 604 can include determining whether one or more stored policies are available for offloading communications to the network interface. In either case, the policies can be identified based at least in part on one or more parameters thereof. At 606, the one or more policies can be applied based at least in part on the configuration of the plurality of network interfaces. Thus, whether downloading the one or more policies is performed or not, one or more appropriate policies can be applied for a given configuration of network interfaces, as described.

Turning to FIG. 7, an example methodology 700 is displayed that facilitates applying policies according to a network interface configuration. At 702, WLAN offload policies can be applied. For example, the WLAN offload policies can relate to utilizing a WLAN connection for specified communication scenarios, as described, such as for certain data types, TCP ports, etc. At 704, deactivation of a WLAN interface or of an ability to concurrently use other interfaces can be detected. In this regard, the WLAN offload policies may no longer be applicable without the WLAN interface. At 706, it can be determined whether non-WLAN offload policies are available. For example, this can include determining whether such policies are locally stored and accessible. If not, non-WLAN offload policies can be downloaded at 708. As described, this can include querying an ANDSF for such policies, retrieving a portion of one or more XML policy definitions, and/or the like. In either case, at 710, non-WLAN offload policies can be applied. Thus, based on the deactivation of the WLAN interface, deactivation of the ability to use multiple interfaces concurrently, etc., non-WLAN offload policies can be utilized for communicating, as described.

It will be appreciated that, in accordance with one or more aspects described herein, inferences can be made regarding detecting modification of a network interface configuration, determining policies for downloading, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
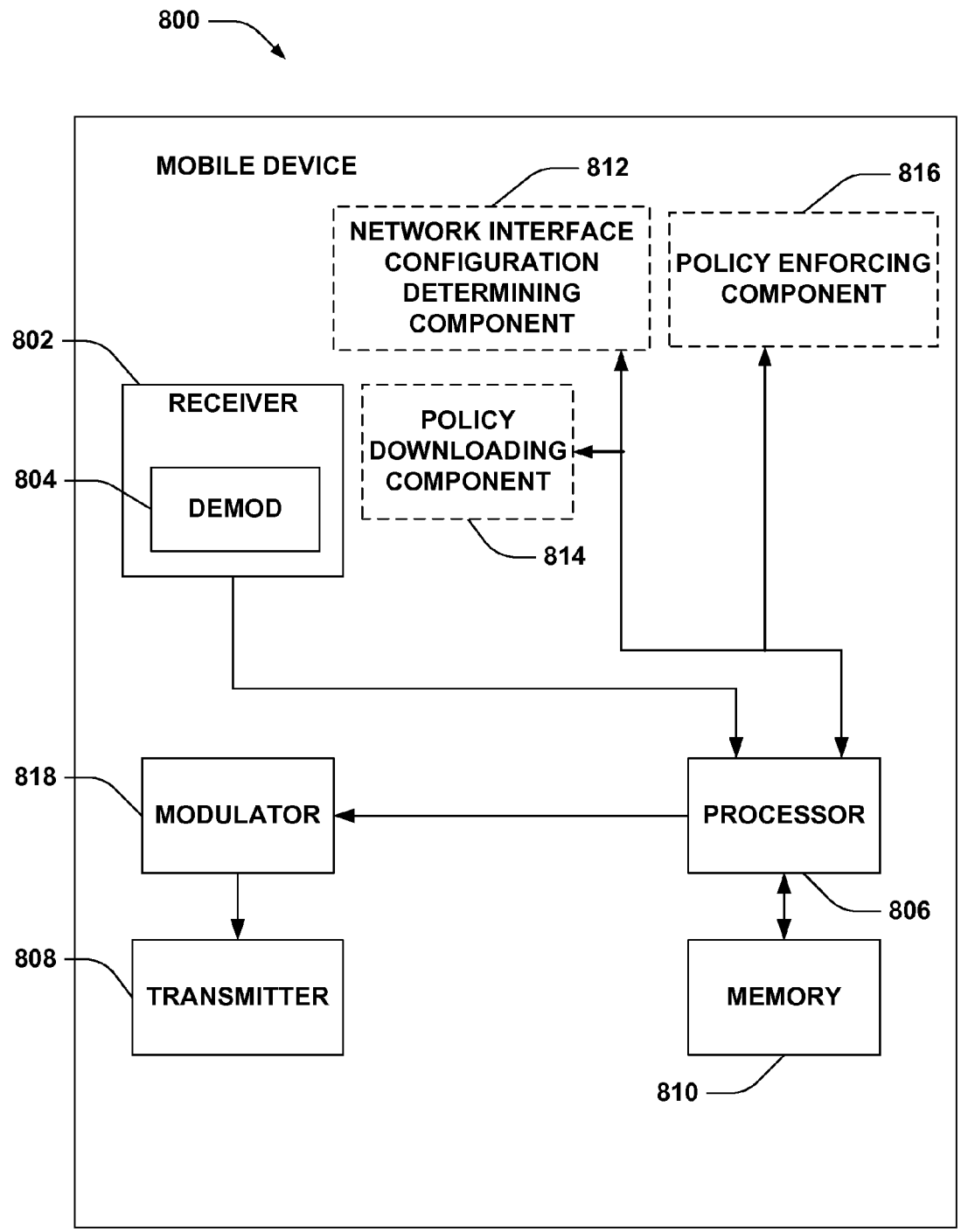
FIG. 8 illustrates an example mobile device for applying one or more policies based at least in part on a network interface configuration.

FIG. 8 is an illustration of a mobile device 800 that facilitates retrieving and/or applying policies for communicating over one or more network interfaces. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800.

Mobile device 800 can additionally comprise memory 810 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 810 can additionally store protocols and/or algorithms associated with estimating and/or utilizing a channel (e.g., performance based, capacity based, etc.).

It will be appreciated that the data store (e.g., memory 810) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

Processor 806 can further be optionally operatively coupled to a network interface configuration determining component 812, which can be similar to network interface configuration determining component 212, a policy downloading component 814, which can be similar to policy downloading component 214, and/or a policy enforcing component 816, which can be similar to policy enforcing component 216. Mobile device 800 still further comprises a modulator 818 that modulate signals for transmission by transmitter 808 to, for instance, a base station, another mobile device, etc. Moreover, for example, mobile device 800 can comprise multiple transmitters 808 for multiple network interfaces, as described. Although depicted as being separate from the processor 806, it is to be appreciated that the network interface configuration determining component 812, policy downloading component 814, policy enforcing component 816, demodulator 804, and/or modulator 818 can be part of the processor 806 or multiple processors (not shown).

Figure 9:
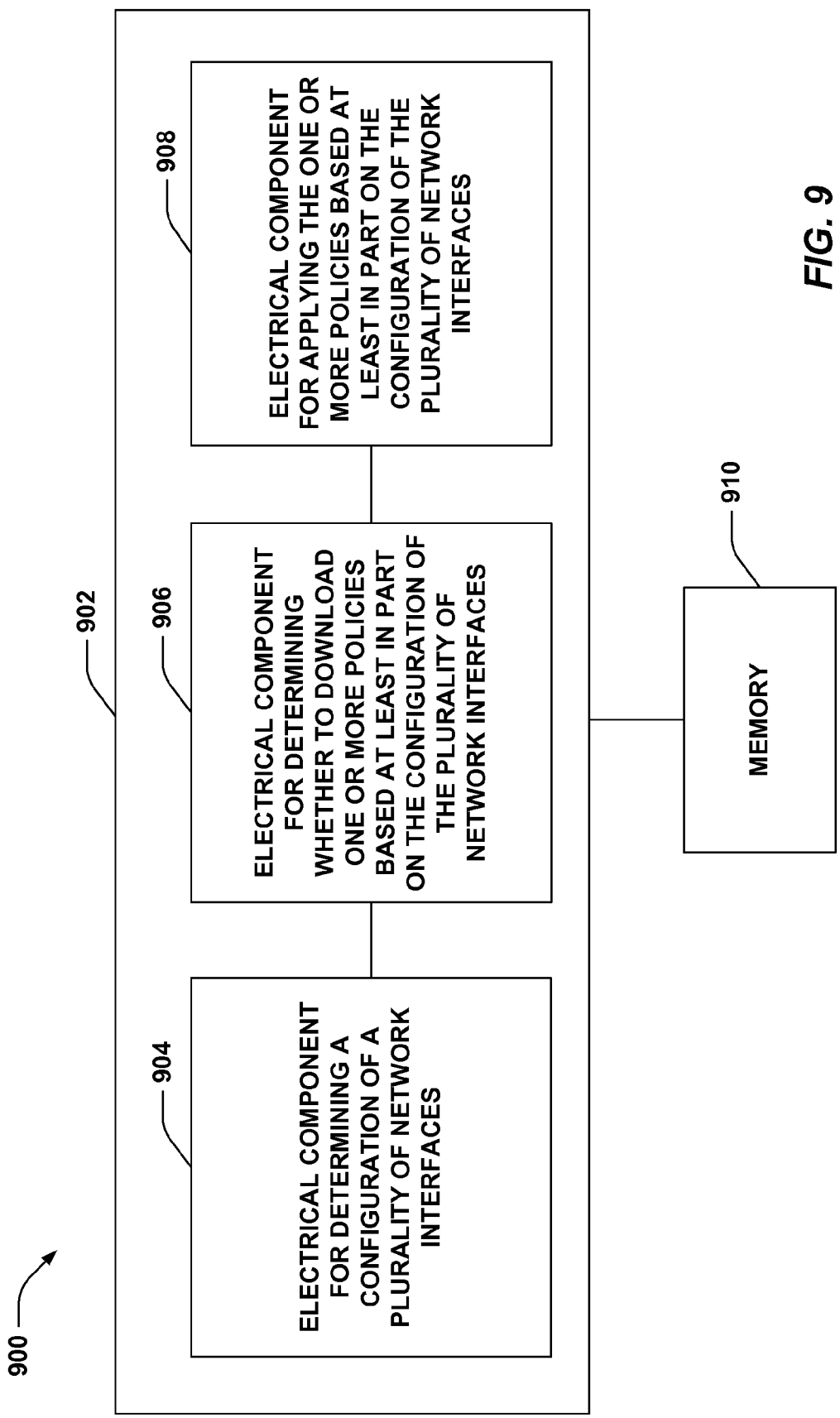
FIG. 9 illustrates an example system for applying policies based at least in part on a determined configuration of network interfaces.

With reference to FIG. 9, illustrated is a system 900 for enforcing policies based at least in part on a network interface configuration. For example, system 900 can reside at least partially within a base station, device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for determining a configuration of a plurality of network interfaces 904. For example, this can include determining existence, activation, connection, etc. regarding one or more network interfaces, such as an LTE, WLAN, or similar network interface. Further, logical grouping 902 can comprise an electrical component for determining whether to download one or more policies based at least in part on the configuration of the plurality of network interfaces 906.

As described, for example, electrical component 906 can determine to download one or more policies based at least in part on determining whether one or more stored polices are available related to communicating using the configuration of network interfaces. Moreover, logical grouping 902 can include an electrical component for applying the one or more policies based at least in part on the configuration of the plurality of network interfaces 908. Thus, a policy utilized can correspond to communicating according to the configuration, as described.

For example, electrical component 904 can include a network interface configuration determining component 212. In addition, for example, electrical component 906, in an aspect, can include a policy downloading component 214, as described above. Furthermore, electrical component 908, in an aspect, can include a policy enforcing component 216, as described. Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910.

In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
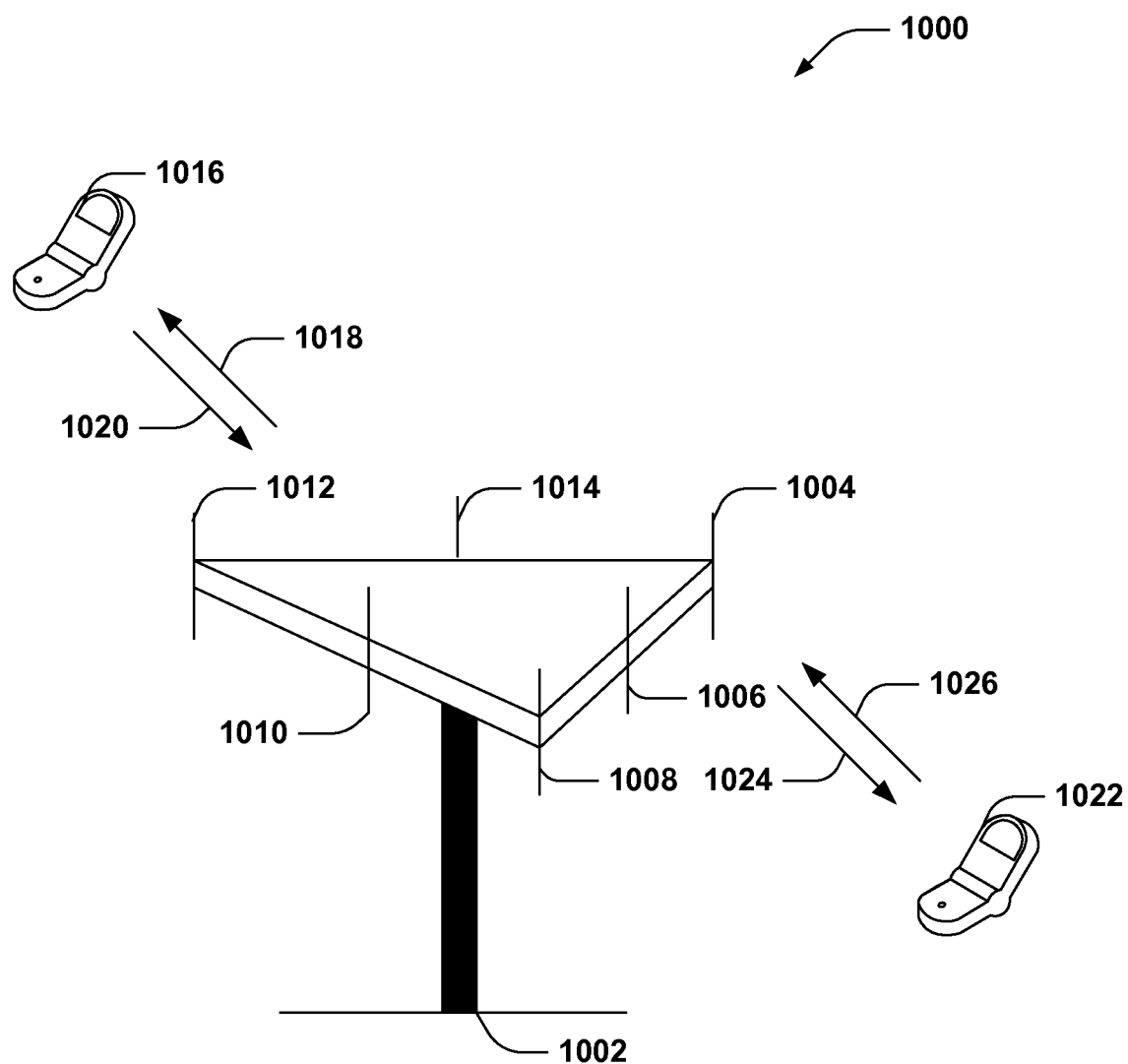
FIG. 10 illustrates an example wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system.

Figure 11:
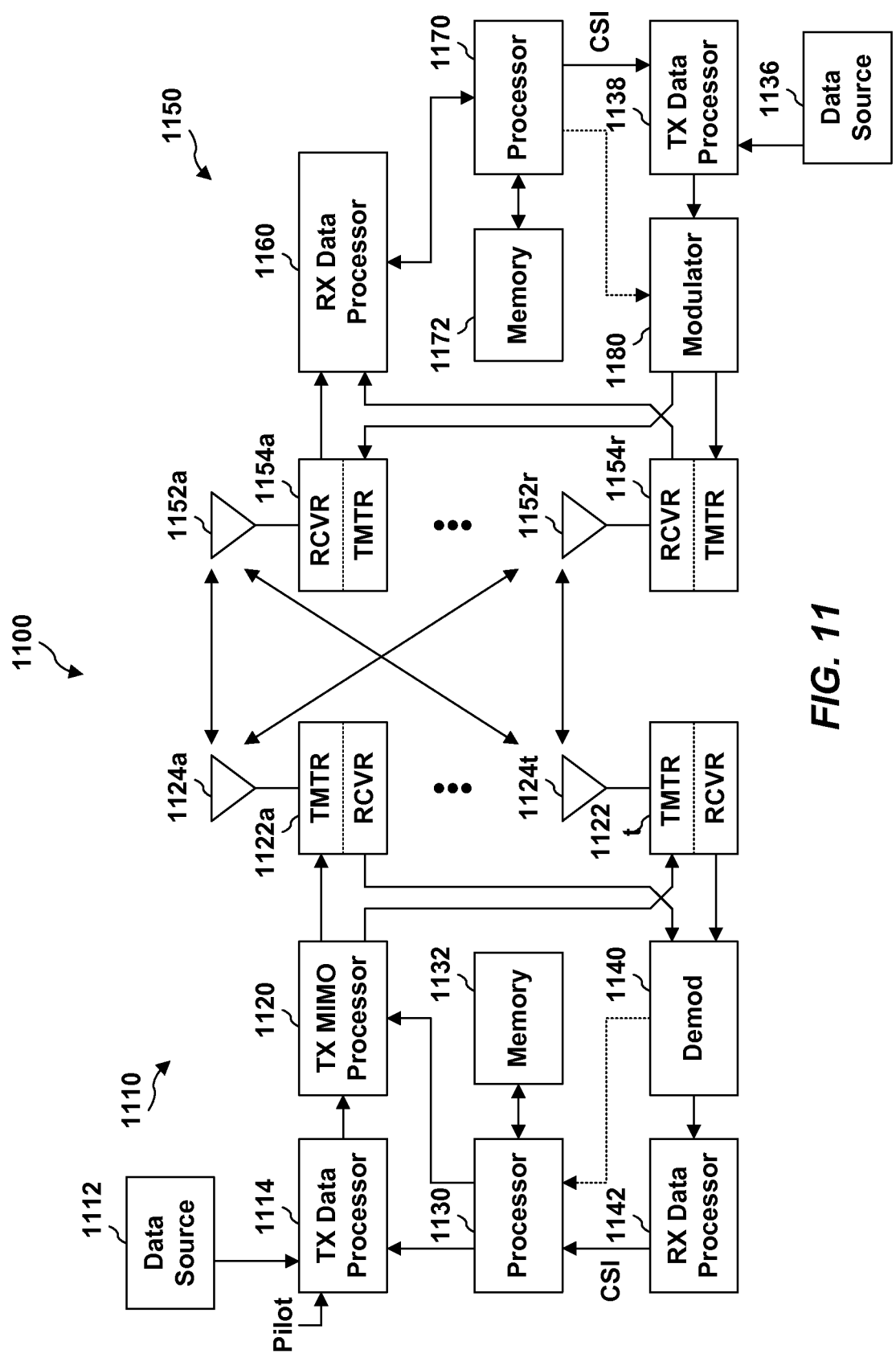
FIG. 11 illustrates an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 9-10), policy and/or extension definitions (FIGS. 4-5), methods (FIGS. 6-7), and/or mobile devices (FIG. 8) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and down-converts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method implemented in a device for communicating over at least one of multiple network interfaces, comprising:
   determining a configuration of a plurality of network interfaces;
   determining whether to download one or more policies based at least in part on the configuration of the plurality of network interfaces, wherein the determining includes monitoring trigger conditions for downloading wireless local area network (WLAN) offload policies and non-WLAN offload policies, wherein the one or more policies indicate network preferences regarding flow distribution over active network interfaces;
   downloading the WLAN offload policies on a condition that WLAN capability of the device is detected, wherein the WLAN offload policies define scenarios for offloading communications from a default network interface to a WLAN interface;
   downloading the non-WLAN offload policies on a condition that deactivation of the WLAN interface of the device is detected, wherein the non-WLAN offload policies comprise policies for communicating without leveraging the WLAN interface; and
   applying the one or more policies including the WLAN offload policies and the non-WLAN offload policies based at least in part on the configuration of the plurality of network interfaces.

2. The method of claim 1, wherein the determining whether to download the one or more policies comprises determining to download the one or more policies related to utilizing a subset of the plurality of network interfaces.

3. The method of claim 1, further comprising detecting a modification to the configuration of the plurality of network interfaces, wherein the determining the configuration of the plurality of network interfaces is based at least in part on the detecting the modification.

4. The method of claim 3, wherein applying the one or more policies comprises applying the one or more policies related to communicating without one of the plurality of network interfaces.

5. The method of claim 4, further comprising downloading the one or more policies, wherein the determining whether to download the one or more policies comprises determining that a set of stored policies do not include policies for communicating without the one of the plurality of network interfaces.

6. The method of claim 3, wherein the detecting the modification comprises detecting activation of one of the plurality of network interfaces, and the applying the one or more policies comprises applying the one or more policies related to offloading communications to the one of the plurality of network interfaces.

7. The method of claim 3, wherein the detecting the modification comprises detecting deactivation of an ability to utilize multiple network interfaces, and the applying the one or more policies comprises applying the one or more policies related to communicating without at least the one of the plurality of network interfaces.

8. The method of claim 1, wherein the plurality of network interfaces further includes a third generation partnership project long term evolution network interface.

9. An apparatus for communicating over at least one of multiple network interfaces, comprising:
   at least one processor configured to:
      discern a configuration of a plurality of network interfaces;
      determine whether to download one or more policies based at least in part on the configuration of the plurality of network interfaces, wherein the at least one processor is configured to monitor trigger conditions for downloading wireless local area network (WLAN) offload policies and non-WLAN offload policies, wherein the one or more policies indicate network preferences regarding flow distribution over active network interfaces;

download the WLAN offload policies on a condition that WLAN capability of the apparatus is detected, wherein the WLAN offload policies define scenarios for offloading communications from a default network interface to a WLAN interface;

download the non-WLAN offload policies on a condition that deactivation of the WLAN interface of the apparatus is detected, wherein the non-WLAN offload policies comprise policies for communicating without leveraging the WLAN interface; and enforce the one or more policies including the WLAN offload policies and the non-WLAN offload policies based at least in part on the configuration of the plurality of network interfaces; and a memory coupled to the at least one processor.

10. The apparatus of claim 9, wherein the at least one processor is further configured to download the one or more policies relating to utilizing a subset of the plurality of network interfaces, and the at least one processor determines to download the one or more policies.

11. The apparatus of claim 9, wherein the at least one processor discerns the configuration of the plurality of network interfaces based at least in part on detecting a modification to the configuration of the plurality of network interfaces.

12. The apparatus of claim 11, wherein the one or more policies relate to communicating without one of the plurality of network interfaces.

13. The apparatus of claim 12, wherein the at least one processor is further configured to download the one or more policies, and the at least one processor determines to download the one or more policies based at least in part on determining that a set of stored policies do not include policies for communicating without the one of the plurality of network interfaces.

14. The apparatus of claim 11, wherein the modification includes activation of one of the plurality of network interfaces, and the one or more policies relate to offloading communications to the one of the plurality of network interfaces in one or more scenarios.

15. The apparatus of claim 11, wherein the modification includes deactivation of an ability to communicate using multiple network interfaces, and the one or more policies relate to communicating without at least the one of the plurality of network interfaces.

16. The apparatus of claim 9, wherein the plurality of network interfaces includes a third generation partnership project long term evolution network interface.

17. An apparatus for communicating over at least one of multiple network interfaces, comprising:

a network interface configuration determining hardware component for determining a configuration of a plurality of network interfaces;

a policy downloading hardware component for determining whether to download one or more policies based at least in part on the configuration of the plurality of network interfaces, wherein the determining includes monitoring trigger conditions for downloading wireless local area network (WLAN) offload policies and non-WLAN offload policies, wherein the one or more policies indicate network preferences regarding flow distribution over active network interfaces, wherein the policy downloading hardware component is configured to download the WLAN offload policies on a condition that WLAN capability of the apparatus is detected, wherein the WLAN offload policies define scenarios for offloading communications from a default network interface to a WLAN interface, and wherein the policy downloading hardware component is further configured to download the non-WLAN offload policies on a condition that deactivation of the WLAN interface of the apparatus is detected, wherein the non-WLAN offload policies comprise policies for communicating without leveraging the WLAN interface; and a policy enforcing hardware component for applying the one or more policies including the WLAN offload policies and the non-WLAN offload policies based at least in part on the configuration of the plurality of network interfaces.

18. The apparatus of claim 17, wherein the one or more policies relate to utilizing a subset of the plurality of network interfaces.

19. The apparatus of claim 17, wherein the network interface configuration determining hardware component for determining the configuration of the plurality of network interfaces detects a modification to the configuration of the plurality of network interfaces.

20. The apparatus of claim 19, wherein the policy enforcing hardware component applies the one or more policies related to communicating without one of the plurality of network interfaces.

21. The apparatus of claim 20, wherein the policy downloading hardware component for determining whether to download the one or more policies determines such based at least in part on determining that a set of stored policies do not include policies for communicating without the one of the plurality of network interfaces.

22. The apparatus of claim 19, wherein the network interface configuration determining hardware component detects the modification as an activation of one of the plurality of network interfaces, and the policy enforcing hardware component applies the one or more policies related to offloading communications to the one of the plurality of network interfaces.

23. The apparatus of claim 19, wherein the network interface configuration determining hardware component detects the modification as a deactivation of an ability to communicate over multiple network interfaces, and the policy enforcing hardware component applies the one or more policies related to communicating without at least the one of the plurality of network interfaces.

24. The apparatus of claim 17, wherein the plurality of network interfaces further includes a third generation partnership project long term evolution network interface.

25. A computer program product for communicating over at least one of multiple network interfaces, comprising:

a non-transitory computer-readable medium, comprising:

code for causing at least one computer to discern a configuration of a plurality of network interfaces;

code for causing the at least one computer to determine whether to download one or more policies based at least in part on the configuration of the plurality of network interfaces and monitor trigger conditions for downloading wireless local area network (WLAN) offload policies and non-WLAN offload policies, wherein the one or more policies indicate network preferences regarding flow distribution over active network interfaces;

code for causing the at least one computer to download the WLAN offload policies on a condition that WLAN capability of a device is detected, wherein the WLAN offload policies define scenarios for offloading communications from a default network interface to a WLAN interface;

code for causing the at least one computer to download the non-WLAN offload policies on a condition that deactivation of the WLAN interface of the device is detected, wherein the non-WLAN offload policies comprise policies for communicating without leveraging the WLAN interface; and code for causing the at least one computer to enforce the one or more policies including the WLAN offload policies and the non-WLAN offload policies based at least in part on the configuration of the plurality of network interfaces.

26. The computer program product of claim 25, wherein the non-transitory computer-readable medium further comprises code for causing the at least one computer to download the one or more policies relating to utilizing a subset of the plurality of network interfaces, and the code for causing the at least one computer to determine determines to download the one or more policies.

27. The computer program product of claim 25, wherein the code for causing the at least one computer to discern discerns the configuration of the plurality of network interfaces based at least in part on detecting a modification to the configuration of the plurality of network interfaces.

28. The computer program product of claim 27, wherein the one or more policies relate to communicating without one of the plurality of network interfaces.

29. The computer program product of claim 28, wherein the non-transitory computer-readable medium further comprises code for causing the at least one computer download the one or more policies, and the code for causing the at least one computer to determine determines to download the one or more policies based at least in part on determining that a set of stored policies do not include policies for communicating without the one of the plurality of network interfaces.

30. The computer program product of claim 27, wherein the modification includes activation of one of the plurality of network interfaces, and the one or more policies relate to offloading communications to the one of the plurality of network interfaces in one or more scenarios.

31. The computer program product of claim 27, wherein the modification includes deactivation of an ability to communicate using multiple network interfaces, and the one or more policies relate to communicating without at least the one of the plurality of network interfaces.

32. The computer program product of claim 25, wherein the plurality of network interfaces further includes a third generation partnership project long term evolution network interface.

33. An apparatus for communicating over at least one of multiple network interfaces, comprising:

a network interface configuration determining hardware component for discerning a configuration of a plurality of network interfaces;

a policy downloading hardware component for determining whether to download one or more policies based at least in part on the configuration of the plurality of network interfaces, wherein the determining includes monitoring trigger conditions for downloading wireless local area network (WLAN) offload policies and non-WLAN offload policies, wherein the one or more policies indicate network preferences regarding flow distribution over active network interfaces, wherein the policy downloading hardware component is configured to download the WLAN offload policies on a condition that WLAN capability of the apparatus is detected, wherein the WLAN offload policies define scenarios for offloading communications from a default network interface to a WLAN interface, wherein the policy downloading hardware component is further configured to download the non-WLAN offload policies on a condition that deactivation of the WLAN interface of the apparatus is detected, and wherein the non-WLAN offload policies comprise policies for communicating without leveraging the WLAN interface; and a policy enforcing hardware component for applying the one or more policies including the WLAN offload policies and the non-WLAN offload policies based at least in part on the configuration of the plurality of network interfaces.

34. The apparatus of claim 33, wherein the one or more policies relate to utilizing a subset of the plurality of network interfaces.

35. The apparatus of claim 33, wherein the network interface configuration determining hardware component detects a modification to the configuration of the plurality of network interfaces.

36. The apparatus of claim 35, wherein the policy enforcing hardware component applies the one or more policies related to communicating without one of the plurality of network interfaces.

37. The apparatus of claim 36, wherein the policy downloading hardware component determines whether to download the one or more policies based at least in part on determining that a set of stored policies do not include policies for communicating without the one of the plurality of network interfaces.

38. The apparatus of claim 35, wherein the network interface configuration determining hardware component detects the modification as an activation of one of the plurality of network interfaces, and the policy enforcing hardware component applies the one or more policies related to offloading communications to the one of the plurality of network interfaces.

39. The apparatus of claim 35, wherein the network interface configuration determining hardware component detects the modification as a deactivation of an ability to communicate over multiple network interfaces, and the policy enforcing hardware component applies the one or more policies related to communicating without at least the one of the plurality of network interfaces.

40. The apparatus of claim 33, wherein the plurality of network interfaces includes a third generation partnership project long term evolution network interface.

* * * * *